(12) United States Patent
Ting

(10) Patent No.: US 10,896,531 B1
(45) Date of Patent: Jan. 19, 2021

(54) USING VISUAL DISTORTION TO EMPHASIZE TARGETED REGIONS OF DATA VISUALIZATIONS ACCORDING TO GEODESIC CURVES

(71) Applicant: Tableau Software, Inc., Seattle, WA (US)

(72) Inventor: Daniel Ting, Seattle, WA (US)

(73) Assignee: Tableau Software, Inc., Seattle, WA (US)

(*) Notice: Subject to any disclaimer, the term of this patent is extended or adjusted under 35 U.S.C. 154(b) by 0 days.

(21) Appl. No.: 16/417,573

(22) Filed: May 20, 2019

Related U.S. Application Data

(60) Provisional application No. 62/673,773, filed on May 18, 2018.

(51) Int. Cl.
  *G01V 99/00* (2009.01)
  *G06F 17/50* (2006.01)
  *G06T 11/20* (2006.01)

(52) U.S. Cl.
  CPC .................. *G06T 11/206* (2013.01)

(58) Field of Classification Search
  CPC ...................................... G06T 11/206
  USPC ......................................... 345/440
  See application file for complete search history.

(56) References Cited

U.S. PATENT DOCUMENTS

| | | | | |
|---|---|---|---|---|
| 2005/0270285 A1* | 12/2005 | Zhou | ...................... | G06T 17/20 345/420 |
| 2006/0251324 A1* | 11/2006 | Bachmann | ........... | G06K 9/6252 382/173 |
| 2008/0181503 A1* | 7/2008 | Schclar | ..................... | G06K 9/38 382/181 |
| 2009/0297046 A1* | 12/2009 | Zhao | ................... | G06K 9/00275 382/224 |
| 2010/0329529 A1* | 12/2010 | Feldman | ............... | G06K 9/4619 382/131 |
| 2011/0091073 A1* | 4/2011 | Iwasaki | ................... | G06T 7/215 382/103 |
| 2012/0206597 A1* | 8/2012 | Komoto | .................. | G06T 7/215 348/135 |
| 2013/0322728 A1* | 12/2013 | Jacobs | ................... | A61B 5/055 382/132 |
| 2015/0074130 A1* | 3/2015 | Kimmel | ................ | G06F 16/284 707/756 |
| 2015/0223777 A1* | 8/2015 | Rasoulian | ............ | A61B 8/4444 600/461 |

(Continued)

*Primary Examiner* — Javid A Amini
(74) *Attorney, Agent, or Firm* — Morgan, Lewis & Bockius LLP

(57) ABSTRACT

This application is directed to modifying display of data visualizations. A computer system visualizes on its display a set of data in a first data space. A focus point is identified in the first data space and used as a starting point for constructing a set of geodesics, each of which is configured to connect the focus point to a respective data point in the first data space. A plurality of primary eigenvectors are determined in the first data space and they are used to create a second data space having fewer dimensions than the first data space. For each data point, the computer system determines a plurality of projection values associated with the primary eigenvectors. The set of data is re-visualized in the second data space created using the projection values of each data point.

20 Claims, 11 Drawing Sheets
(3 of 11 Drawing Sheet(s) Filed in Color)

(56) References Cited

U.S. PATENT DOCUMENTS

| | | | |
|---|---|---|---|
| 2016/0132754 A1* | 5/2016 | Akhbardeh | G06K 9/00771 |
| | | | 382/103 |
| 2016/0132904 A1* | 5/2016 | Mondal | G06Q 30/0201 |
| | | | 705/7.29 |
| 2016/0171695 A1* | 6/2016 | Jacobs | G06T 11/005 |
| | | | 382/131 |
| 2018/0089815 A1* | 3/2018 | Hu | G06K 9/6224 |
| 2018/0188415 A1* | 7/2018 | Imhof | G01V 99/005 |

* cited by examiner

Figure 5A
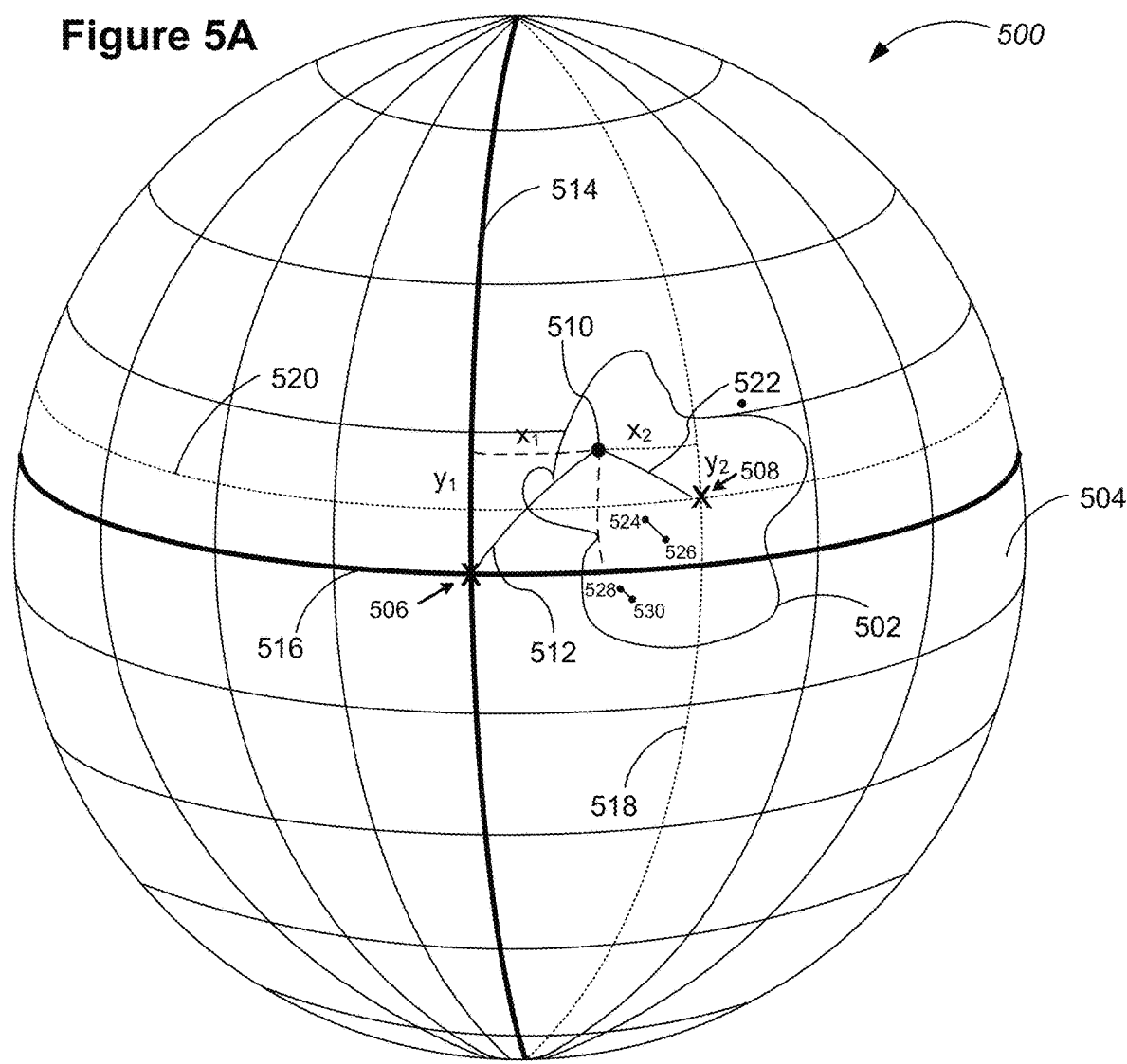
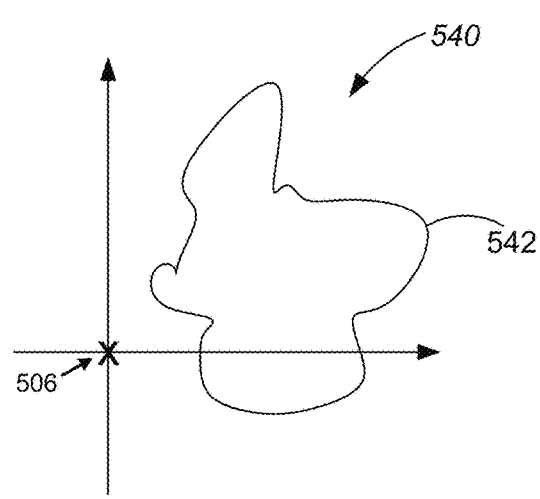
Figure 5B
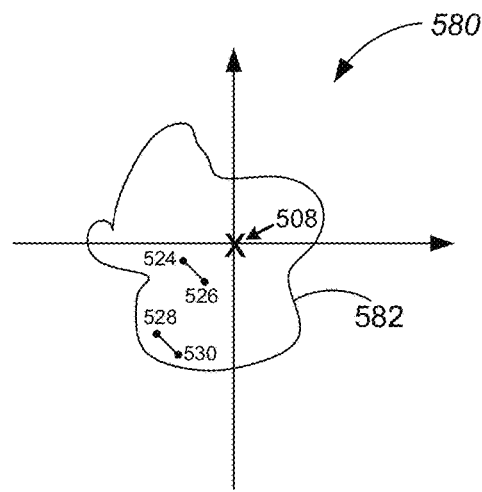
Figure 5C

USING VISUAL DISTORTION TO EMPHASIZE TARGETED REGIONS OF DATA VISUALIZATIONS ACCORDING TO GEODESIC CURVES

CROSS REFERENCE TO RELATED APPLICATIONS

This application claims priority to U.S. Provisional Application Ser. No. 62/673,773, filed May 18, 2018, entitled "Using Visual Distortion to Emphasize Targeted Regions of Data Visualizations According to Geodesic Curves," which is incorporated by reference herein in its entirety.

TECHNICAL FIELD

The disclosed implementations relate generally to data visualization and more specifically to systems and methods for globally modifying data visualizations in ways that accurately reconstruct local neighborhoods of interest but allow for distortion of distant neighborhoods.

BACKGROUND

Machine learning techniques can be applied to analyze a large number of data points that are visualized in a data space and reduce the number of dimensions to improve understanding of the data in the context of a specific region of interest. These machine learning techniques include Local Linear Embedding, Isomap, Laplacian Eigenmaps, Local Tangent Space Alignment, Maximum Variance Unfolding (MVU), Stochastic Neighborhood Embedding (SNE), and t-SNE. For example, chemists use these machine learning techniques to understand the dynamics of molecular reactions, such as how to identify low dimensional data pathways connecting reaction states described by a large number of data points. This facilitates data sampling and simulation during the course of understanding the dynamic molecular reactions.

For most of these machine learning techniques, there is limited understanding about properties of the subset of the large number of data points having a lower dimension. These properties may only hold if a condition on the large number of data points is satisfied. For example, Isomap preserves isometries only when a manifold structure corresponding to the analyzed large number of data points is convex. When the conditions on the analyzed data points are not met, the representation of the large number of data points in the resulting subset can be grossly distorted. Sometimes, conditions associated with some machine learning techniques are satisfied. However, these machines learning techniques can be expensive to implement, particularly as the number of data points increases. Because of this, there is a need for techniques to efficiently reduce the number of dimensions of a large number of data points in order to better understand a local region of data points.

SUMMARY

Accordingly, some implementations of this application are directed to globally modifying data visualizations in ways that accurately reconstruct local neighborhoods of interest but allow for distortion of distant neighborhoods. A set of data points having a first number of dimensions is simplified efficiently for visualization in a second number of dimensions that is less than the first number of dimensions.

In accordance with some implementations, a method is implemented at a computer system having a display. For example, the computer system can be a smart phone, a tablet, a notebook computer, a desktop computer or a data visualization server. The method includes visualizing on the display a set of data according to a first data space having a first number of dimensions, identifying a focus point in the first data space, and constructing a set of geodesics using the focus point as a starting point. Each geodesic is configured to connect the focus point to a respective data point in the first data space. The method further includes determining, in the first data space, a second number of primary eigenvectors, where the second number is less than the first number. The method further includes, for each data point, determining a second number of projection values, each of which is associated with a distinct one of the second number of primary eigenvectors. The method further includes creating a second data space based on the second number of primary eigenvectors, and re-visualizing the set of data in the second data space using the second number of projection values of each data point in the set of data. The second data space has the second number of dimensions.

In some implementations, a data visualization method includes displaying a data visualization of a set of data, receiving selection of a focus point in the data visualization, constructing a set of geodesics using the focus point as a starting point, and using the constructed geodesics to form a vector field. The data visualization method further includes constructing as sparse basis for the vector field, constructing a positive semidefinite differential operator for the vector field, and applying the differential operator to modify the displayed data visualization, thereby emphasizing a region around the focus point and visually distorting portions of the data visualization outside of the region.

In some implementations, a computer device includes one or more processors, memory, a display, and one or more programs stored in the memory. The programs are configured for execution by the one or more processors. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

In some implementations, the above methods include generating a differential operator. The present disclosure extends this characterization to Maximum Variance Unolding (MVU) and shows that MVU learns a differential operator that preserves global properties of the set of data. In some implementations, this differential operator is shown to induce a vector field in the first data space, and, if the set of data can be unrolled to a lower dimension, this vector field fully characterizes the global properties. In this way, the set of data having desirable properties can be engineered using characterization of the vector field (e.g., via a positive semidefinite differential operator). In particular, re-visualization of the set of data in the second data space (having a lower dimension) accurately reconstructs a local neighborhood of interest but allows for distortion of distant neighborhoods.

BRIEF DESCRIPTION OF THE DRAWINGS

The patent or application file contains at least one drawing executed in color. Copies of this patent or patent application publication with color drawings will be provided by the Office upon request and payment of the necessary fee.

For a better understanding of the aforementioned systems, methods, and graphical user interfaces, as well as additional systems, methods, and graphical user interfaces that provide techniques for modifying display of data visualizations, reference should be made to the Description of Implementations below, in conjunction with the following drawings in which like reference numerals refer to corresponding parts throughout the figures.

FIG. 5A illustrates a representative three-dimensional data space having an island located on a surface of a sphere in accordance with some implementations. FIGS. 5B and 5C illustrate corresponding two-dimensional data spaces, including areas projected from the island with reference to two distinct focus points, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

Description of Implementations

Figure 1:
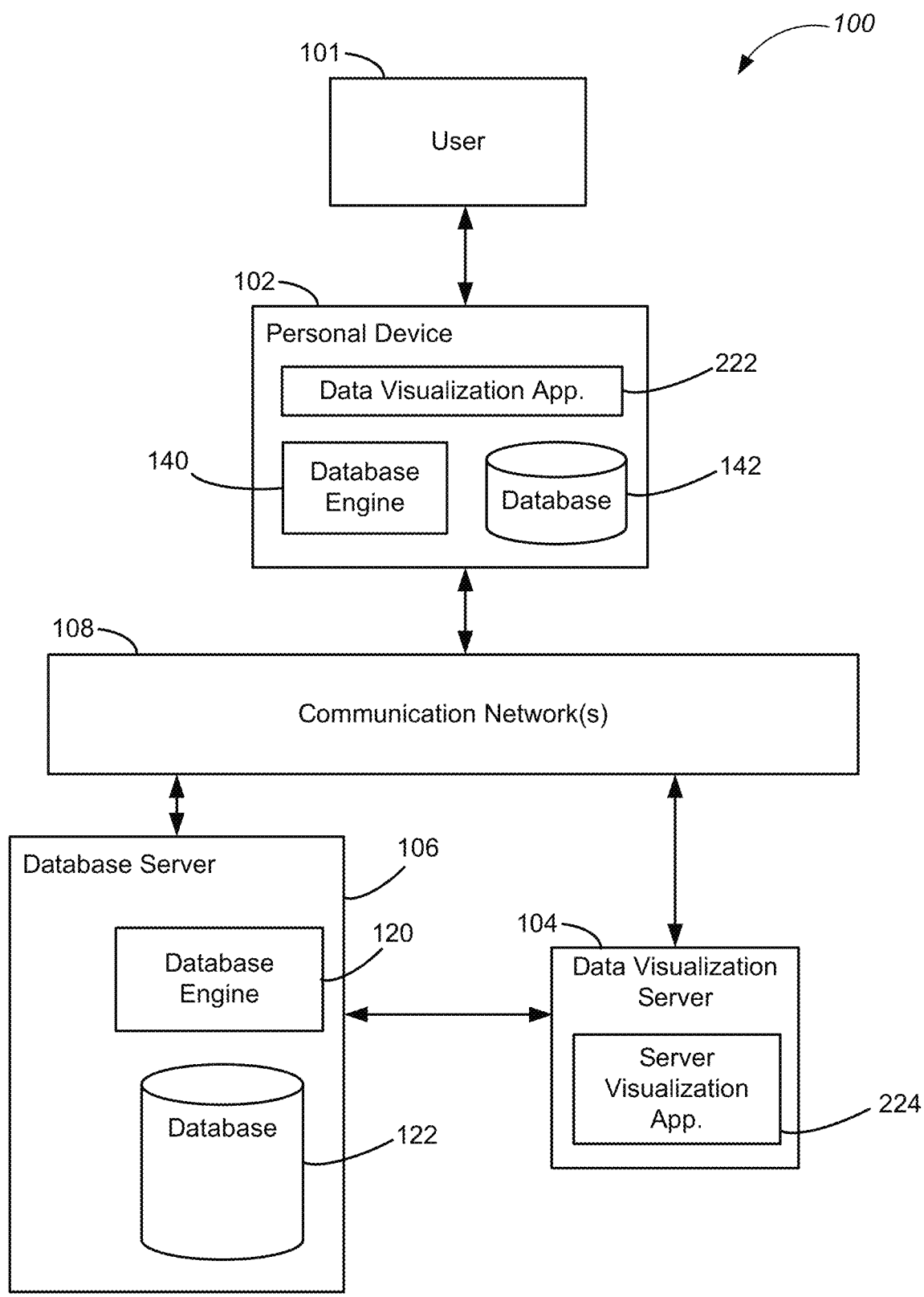
FIG. 1 illustrates a data visualization environment in which data is visualized according to configuration parameters selected by a user.

FIG. 1 illustrates a data visualization environment 100 in which data is visualized according to configuration parameters selected by a user. A user 101 interacts with a personal device 102, such as a desktop computer, a laptop computer, a tablet computer, a mobile smartphone, or a mobile computer system. A personal device 102 is an example of a computer system 200. The term "computer system" also includes server computers, which may be significantly more powerful than a personal device used by a single user, and are generally accessed by a user indirectly via a personal device. An example computer system 200 is described below with respect to FIG. 2, including various software programs or modules that are executed on the system 200. In some implementations, the personal device 102 includes one or more desktop data sources (e.g., CSV files or spreadsheet files). In some implementations, the personal device 102 includes a database engine 140, which provides access to one or more databases 142 (e.g., SQL databases). Data stored in the databases 142 of the personal device 102 is retrieved in accordance with database queries received by the database engine 140. In some implementations, the personal device 102 includes a data visualization application 222, which the user 101 uses to create data visualizations from the desktop data sources and/or the databases 142. For example, the data visualization application 222 of the personal device 102 generates a database query for a data visualization, and sends the database query to the database engine 140. The database engine 140 then retrieves data stored in the database 142 in response to the database query. Upon receiving the retrieved data from the database engine 140, the data visualization application 222 visualizes the retrieved data locally, thereby enabling the user 101 to visualize the data that is stored locally on the personal device 102.

In some implementations, the personal device 102 connects to one or more external database servers 106 and/or a data visualization server 104. Each of the one or more database servers 106 includes a database engine 120 configured to access one or more databases 122 that are stored at the respective database server 106. In some implementations, the data visualization server 104 includes a database engine 120 and one or more databases 122, and the database engine 120 is configured to access one or more databases 122 of the data visualization server 104.

In some implementations, data visualization functionality is implemented only by the data visualization application 222 of the personal device 102 locally. In some implementations, the data visualization functionality is provided collectively by the local data visualization application 222 and a server visualization application 224 located at the remote data visualization server 104, particularly when corresponding data retrieval or visualization involves resource intensive operations that are preferably implemented at a specialized server. In this situation, the user 101 may initiate a data visualization process using the local data visualization application 222 of the personal device 102. One or more requests are received through a data visualization interface of the application 222 and sent to the data visualization server 104 to generate data visualization results by the server visualization application 224.

In some implementations, data is provided by a live data stream and visualized in the data visualization application 222 of the personal device 102 and/or the data visualization server 104. Earlier data items of the data stream are retrieved from the database 142 of the personal device 102 or the database server 106, and visualized in the personal device 102 or the data visualization server 106, concurrently while subsequent data items of the data stream are generated and stored into the databases 142 of the personal device 102 and/or the database server 104. In some situations, the data items in the live data stream are not stored into the database 140 prior to visualization. Rather, the data items in the data stream are cached in a cache of the personal device 102 or the data visualization server 104. The earlier data items of the data stream are retrieved from the cache and visualized by the personal device 102 or the data visualization server 104, concurrently while the subsequent data items of the data stream are generated and stored into the cache. Data items in the live data stream are generated and provided by the personal device 102, the data visualization server 104, other client devices that are communicatively coupled to the personal device 102 and the data visualization server 104 via one or more communication networks 108 (wired or wireless), or any combination thereof.

In some implementations, the personal device 102 connects to the external database servers 106 and/or the data visualization server 104 over one or more communications networks 108. The communication networks 108 can include one or more network topologies, including the Internet, intranets, local area networks (LANs), cellular networks, Ethernet, Storage Area Networks (SANs), telephone networks, Bluetooth personal area networks (PAN), and the like. In some implementations, the data visualization server 104 provides a data visualization web application that runs within a web browser 220 on the personal device 102.

In accordance with some implementations, a computer system (e.g., the personal device 102 or the data visualization server 104) displays a data visualization user interface 300 for a user 101. The user selects one or more data sources for a data visualization and defines various configuration parameters for the data visualization. Some of the configuration parameters are set by assigning one or more data fields from the data source. For example, the x and y position of visual marks can be specified according to data fields placed onto the columns shelf 320 and rows shelf 322 in the user interface. The user can also use an axis configuration window to specify how the axes of the data visualization are displayed. Based on the user-selected configuration parameters, the data visualization application 222 displays a data visualization, including axes that may be scaled according to a logarithmic scaling or a symmetric logarithmic scaling.

Figure 2:
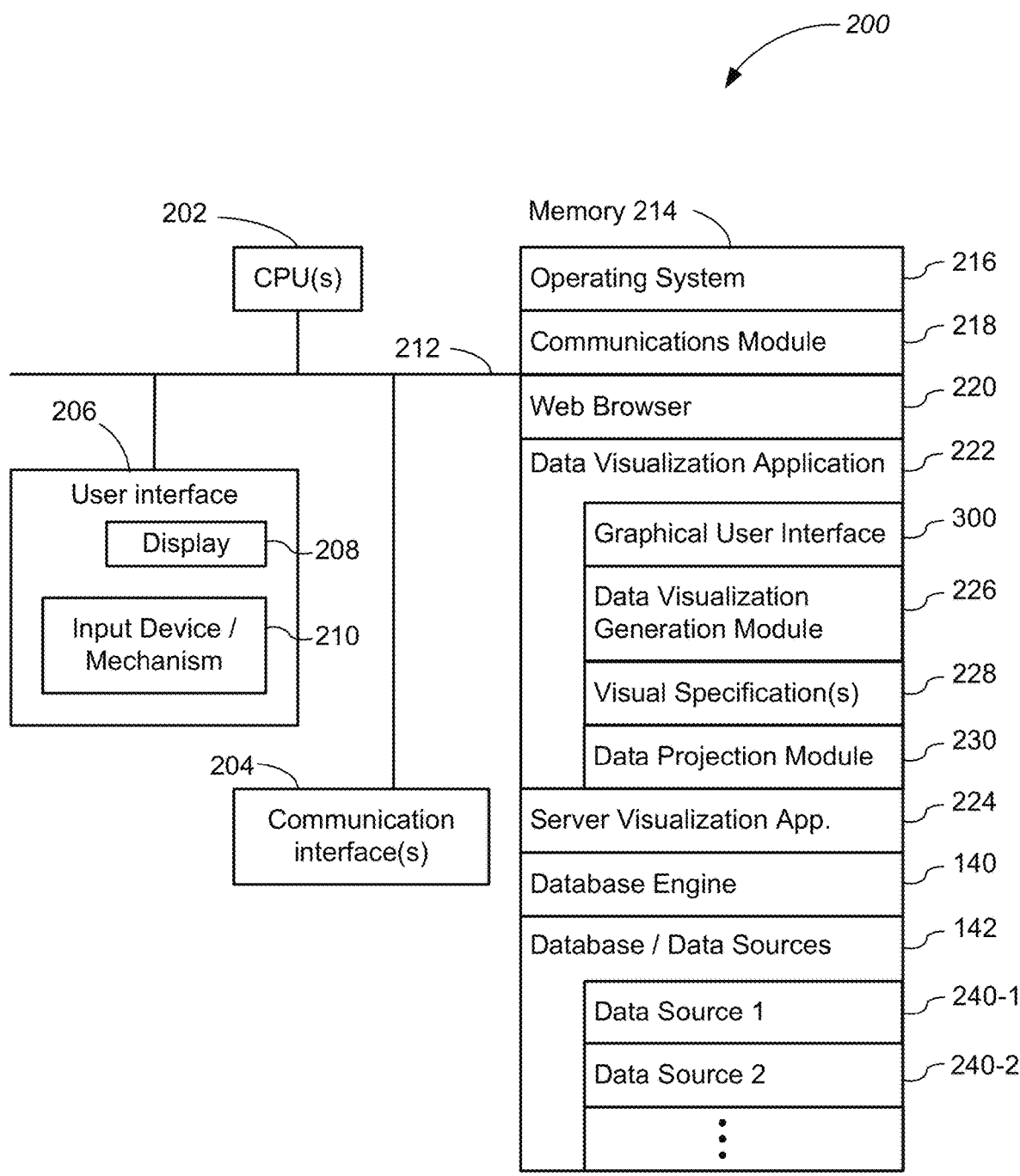
FIG. 2 is a block diagram illustrating a computer system that can display a graphical user interface for a data visualization application in accordance with some implementations.

FIG. 2 is a block diagram illustrating a computer system 200 that can display a graphical user interface 300 in accordance with some implementations. Various examples of the computer system 200 include a desktop computer, a laptop computer, a tablet computer, and other computer devices that have a display and a processor capable of running a data visualization application 222. The computer system 200 includes personal devices 102 and data visualization servers 104. The computer system 200 typically includes one or more processing units/cores (CPUs) 202 for executing modules, programs, and/or instructions stored in the memory 214 and thereby performing processing operations, one or more network or other communications interfaces 204; memory 214 and one or more communication buses 212 for interconnecting these components. The communication buses 212 may include circuitry that interconnects and controls communications between system components.

The computer system 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computer system 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 300 (FIG. 3) for a user to construct visual graphics and includes at least:
  - a data visualization generation module 226, which takes the user input (e.g., a visual specification 228) and generates a corresponding visual graphic (also referred to as a "data visualization" or a "data viz") for display in the user interface 300; and
  - a data projection module 230, which projects a set of data visualized in a first data space to a second data space having a smaller number of dimensions than the first data space;
- a server visualization application 224, which provides ancillary processing to the data visualization application 222 (e.g., performing processor intensive operations or delivering web pages for the data visualization application 222 when it is running in a web browser);
- a database engine 140, which receives database queries, generates execution plans, executes the generated execution plans to retrieve data from local or remote databases, and returns results corresponding to the received database queries; and zero or more databases or data sources 142 (e.g., a first data source 240-1 and a second data source 240-2), which are used by the data visualization application 222. In some implementations, the data sources are stored as spreadsheet files, CSV files, XML, files, or flat files, JSON files, cloud storage, or stored in a relational database.

In some implementations, the graphical user interface 300 allows a user to select one or more data sources 240 (which may be stored on the computer system 200 or stored remotely in the database server 106), and select data fields for use in a visual graphic based on the one or more databases 142. In some implementations, the information the user provides is stored in the memory 214 as a visual specification 228. In some implementations, the data visualization application 222 executes as a standalone application (e.g., a desktop application). In some implementations, the data visualization application 222 executes within the web browser 220 or another application using web pages provided by a web server application on the visualization server 104.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computer system 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
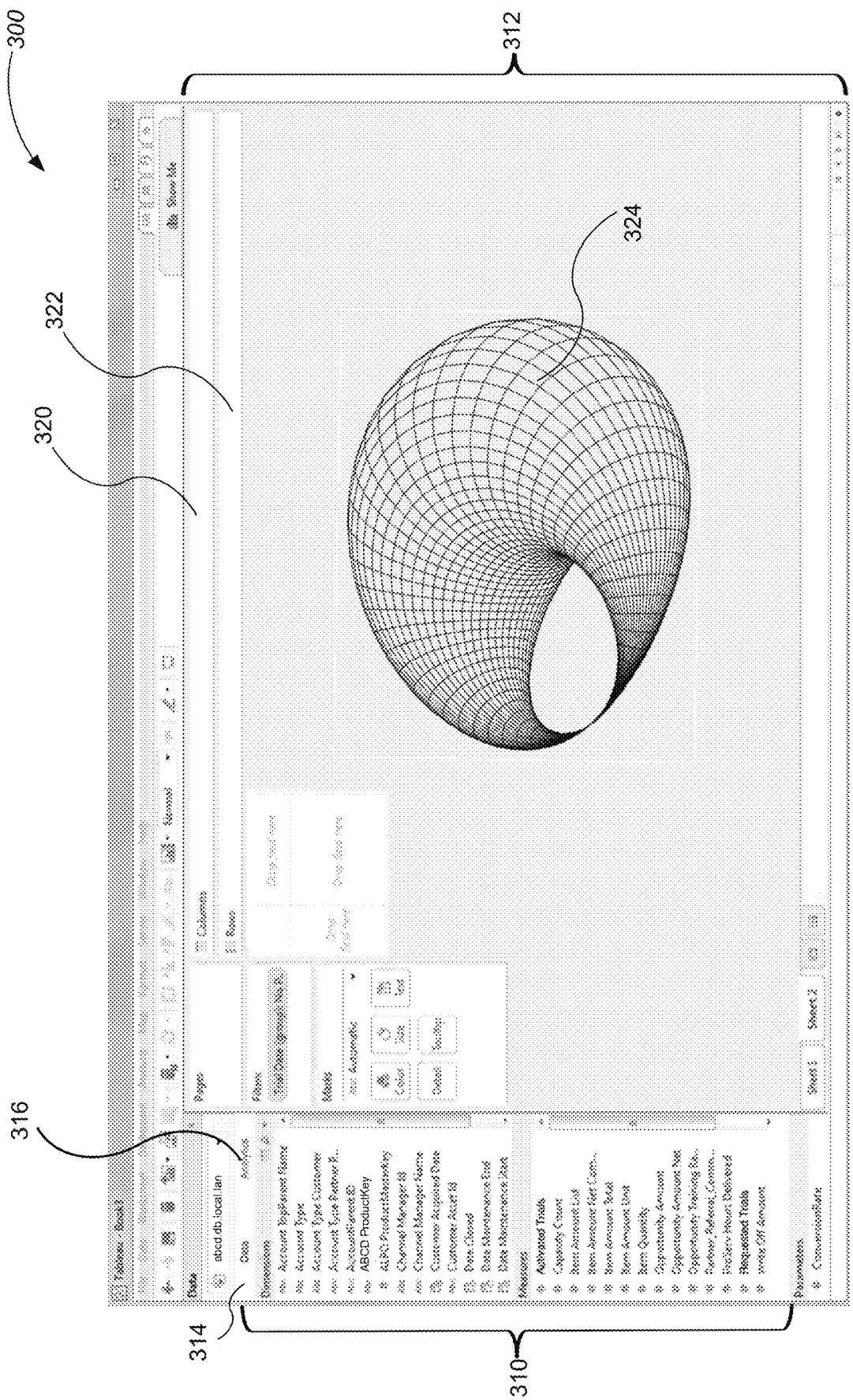
FIG. 3 illustrates a graphical user interface for interactive data analysis in accordance with some implementations.

FIG. 3 illustrates a graphical user interface 300 for interactive data analysis in accordance with some implementations. The user interface 300 includes a Data tab 314 and an Analytics tab 316 in accordance with some implementations. When the Data tab 314 is selected, the user interface 300 displays a schema information region 310, which is also referred to as a data pane. The schema information region 310 provides named data elements (e.g., field names) that may be selected and used to build a data visualization. In some implementations, the list of field names is separated into a group of data dimensions (e.g., categorical data) and a group of measures (e.g., numeric quantities). Some implementations also include a list of parameters. When the Analytics tab 316 is selected, the user interface 300 displays a list of analytic functions instead of data elements (not shown).

The graphical user interface 300 also includes a data visualization region 312. The data visualization region 312 includes a plurality of shelf regions, such as a columns shelf region 320 and a rows shelf region 322, which determine horizontal and vertical placement of visual marks for a data visualization. These are also referred to as the column shelf 320 and the row shelf 322. In some implementations, the plurality of shelf regions includes three or more shelf regions corresponding to a data space having three or more dimensions. As illustrated here, the data visualization region 312 also has a large space for displaying a visual graphic. When no data elements have been selected yet, the space initially has no visual graphic. In this example, a two-dimensional perspective view is displayed in the data visualization region 312 to illustrate a three-dimensional Dupin cyclide 324. In some implementations, the data visualization region 312 has multiple layers that are referred to as sheets.

In some instances, a scatter chart is displayed in the data visualization region 312, with a y-axis of the scatter chart correspond to a first data field. The y-axis is displayed according to a symmetric logarithmic scale. As a result, a plurality of tick marks are evenly distributed on the positive y-axis to represent different orders of magnitude (e.g., 0.1, 1, 10, 100, and 1000). Also, the negative y-axis represents orders of magnitude for negative values.

In some implementations, a set of data includes a first number of dimensions, and is visualized into a first data space corresponding to the first number of dimensions. For example, the set of data is organized in a database according to a plurality of named data elements (e.g., field names) that may be selected from the schema information region 310. A subset of the named data elements is selected from the schema information region 310 and used to build the first data space. Each data axis in the first data space is consistent with a respective data element of the subset of named data elements. In some implementations, the first data space has three or more dimensions, and the set of data is visualized in the data visualization region 312 (which is two-dimensional) from a certain perspective of the first data space. The visualized perspective of the first data space is optionally selectable by the user 101 of the computer system 200.

In some implementations, when visualized in the first data space, the set of data demonstrates a certain non-linear relationship (e.g., it is substantially distributed on a curved surface in a three-dimensional surface). However, in any possible perspective view of the first data space, a large number data points in the set of data overlap with each other in the two-dimensional data visualization region 312. In various implementations of this application, the set of data is re-visualized in a second data space that has a second number of dimensions. The second data space is converted from the first data space and has a smaller number of dimensions. In an example, a three-dimensional first data space is converted to a two-dimensional second data space. The two-dimensional second data space corresponds to a curved surface of the first data space on which the set of data is substantially distributed. Specifically, a focus point is identified in the first data space, and a set of geodesics is constructed using the focus point as a starting point to connect the focus point to the data points in the set of data in the first data space. For each data point, a geodesic is optionally a shortest path connecting the focus point and each data point via other data points in the set of data. In other instances, the geodesic is the shortest path connecting the focus point and each data point in the second data space, but does not have to pass through the data points in the set of data. The geodesics are used to determine eigenvalues of the data points in the second data space, so that the data points can be visualized in the second data space according to the determined eigenvalues. By these means, the curved surface on which the set of data is distributed is unrolled so that a correlation among the set of data can be better shown in the second data space.

Figure 4A:
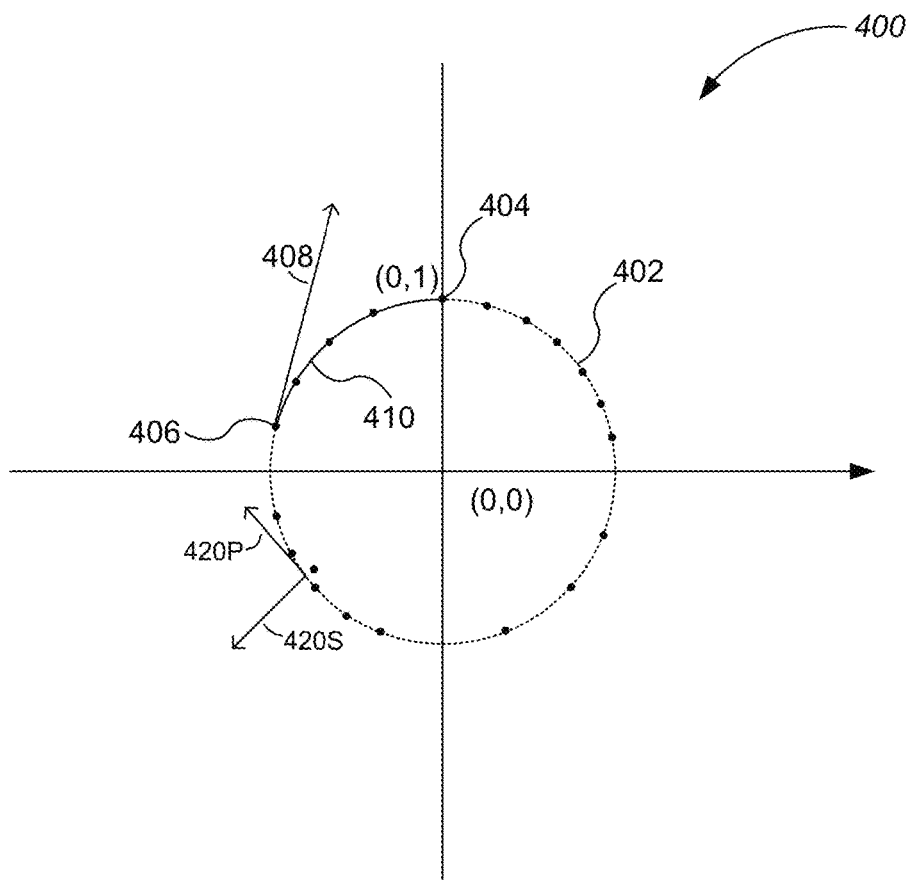
FIG. 4A illustrates a representative two-dimensional data space having a circle in accordance with some implementations.
Figure 4B:
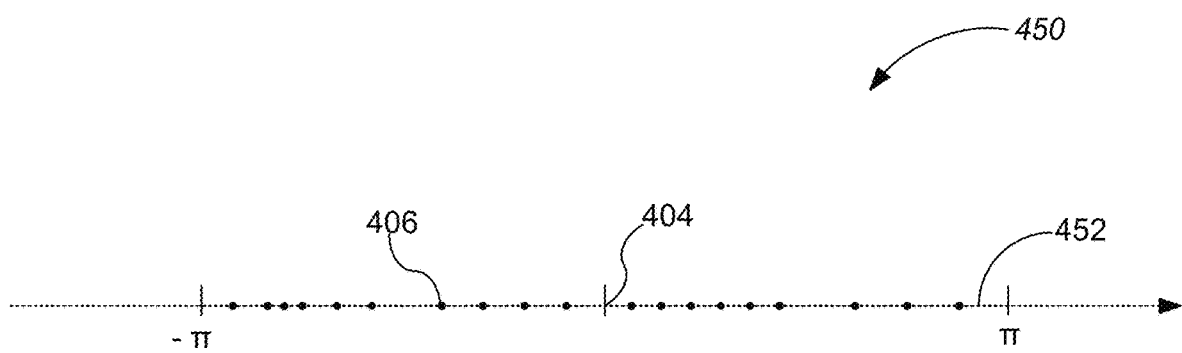
FIG. 4B illustrates a representative one-dimensional data space having a line segment projected from the circle in accordance with some implementations.

FIG. 4A illustrates a representative two-dimensional data space 400 having a circle 402 in accordance with some implementations, and FIG. 4B illustrates a representative one-dimensional data space 450 having a line segment 452 projected from the circle 402 in accordance with some implementations. A set of data is distributed on the circle 402. The circle 402 is centered at the origin (0, 0) of the two-dimensional data space 400 and has a diameter of 1. A focus point 404 is selected at (0, 1) in this two-dimensional data space 400. The one-dimensional data space 450 has an origin set at the focus point 404. The one-dimensional data space 450 is configured to track the circle 402 that connects the set of data in the two-dimensional data space 400, and has an eigenvector (also called a characteristic vector) aligned with a tangent direction of the circle 402 at each data point in the set of data. Data points in the set of data are thereby re-visualized in the one-dimensional data space 450 based on distances of these data points from the focus point.

The one-dimensional data space 450 is based on a vector field that is formed on a sparse basis based on geodesics of data points in the set of data. A geodesic is constructed to connect the focus point 404 and each data point (e.g., a data point 406) in the set of data by following the circle 402. Each data point in the set of data is associated with a vector in the vector field associated with the data space 400. For the data point 406, the corresponding vector 408 has a magnitude (also called an eigenvalue) equal to a length of the geodesic 410 and a direction that is tangent to the circle 402 and points to the focus point 404. The directions of the vectors in the vector field are either aligned with or opposite to the eigenvector aligned with a tangent direction of the circle 402, and therefore, when the geodesic 410 is projected to the eigenvector, a corresponding eigenvalue is equal to the length of the geodesic 408. As such, the set of data is re-visualized into a line segment 452 covering a range of $[-\pi, \pi]$ in the one-dimensional data space 450.

It is noted that in some implementations, the set of data is distributed on or in close proximity to the circle 402 (e.g., less than 0.05 from the circle 402). The eigenvector aligned with the circle 402 is a primary eigenvector 420P corresponding to a secondary eigenvector 420S perpendicular to the primary eigenvector 420P. The circle 402 and primary eigenvector 420P are determined when the geodesics of all data points in the set of data are projected to the secondary eigenvector 420S and a sum of the projections of the geodesics is minimized (i.e., a projection of the vector field is minimized with respect to the secondary eigenvector 420S). Stated another way, the circle 402 is determined to fit the set of data best. In some implementations, a positive semidefinite differential operator is applied to the set of data to enable minimizing the sum of the projections, identify the secondary eigenvector 420S and determine the primary eigenvector 420P.

FIG. 5A illustrates a representative three-dimensional data space 500 having an island 502 located on a surface of a sphere 504 in accordance with some implementations. FIGS. 5B and 5C illustrate representative two-dimensional data spaces 540 and 580 including areas 542 and 582 projected from the island 502 with reference to two distinct focus points 506 and 508 in accordance with some implementations. A set of data representing the island is distributed on the surface of the sphere 504. A location on the surface of the sphere 504 is optionally measured with respect to longitude, latitude and elevation coordinates in a geographic coordinate system. In some instances, the focus point 506 is external to the island 502. In some instances, the focus point 508 is located on the island 502. The two-dimensional data space 540 or 580 has an origin set at the focus point 506 or 508, respectively. The two-dimensional data space 540 or 580 is configured to track the surface of the sphere 504 that connects the set of data corresponding to the locations of the island 502, and has two eigenvectors (also called two characteristic vectors). In some implementations, one of the two eigenvectors is aligned with a tangent direction of a longitude line at each location, and the other one of the two eigenvectors is aligned with a tangent direction of a latitude line at each location. Data points corresponding to the island 502 are re-visualized in the two-dimensional data space 540 or 580 based on distances measured on the surface of the sphere 504 from the focus point 506 or 508 to these data points, respectively.

Referring to FIG. 5B, the two-dimensional data space 540 is based on a vector field that is formed on a sparse basis based on geodesics of data points in the set of data. A geodesic 512 is constructed to connect the focus point 506 and each data point (e.g., a data point 510) in the set of data on the surface of the sphere 504. Each data point in the set of data is associated with a vector in the vector field associated with the data space 540. For the data point 510, the corresponding vector has a magnitude equal to a length of the geodesic 512 and a direction parallel to a tangent surface of the sphere 504 at the respective data point 510. The focus point 506 is located at an intersection of a line of longitude 514 and a line of latitude 516. Two eigenvectors are defined for the two-dimensional data space 540 based on the line of longitude 514 and the line of latitude 516. The vector associated with each data point is projected to the two eigenvectors of the data space 540 to result in two projection values $(x_1, y_1)$, such that the set of data associated with the island 502 can be re-visualized into the area 542 in the data space 540 using the two projection values $(x_1, y_1)$ for each data point.

Likewise, referring to FIG. 5C, the focus point 508 is located at an intersection of a line of longitude 518 and a line of latitude 520, and the two-dimensional data space 580 is defined by two eigenvectors that are based on the line of longitude 518 and the line of latitude 520. Each data point in the set of data is associated with a vector in the vector field associated with the data space 580. For the data point 510, the corresponding vector has a magnitude equal to a length of a geodesic 522 and a direction parallel to a tangent surface of the sphere 504 at the respective data point 510. The vector associated with each data point is projected to the two eigenvectors of the data space 580 to result in two projection values $(x_2, y_2)$, such that the set of data associated with the island 502 can be re-visualized into the area 582 in the data space 580 using the two projection values $(x_2, y_2)$ for each data point.

In a specific example (not shown), a map is centered on a Null Island located at coordinates 0° N 0° E in latitude and longitude. Orthogonal tangent vectors are identified with respect to the equator and prime meridian. Geodesics are generated for locations on the Null Island, and projected to the equator and prime meridian. For each location on the Null Island, two shortest paths are identified to access the equator and the prime meridian. The two eigenvectors are defined according to the equator and the prime meridian, and the corresponding eigenvalues are determined by the lengths of the shortest paths to the equator and prime meridian. The Null Island can therefore be re-visualized in the two-dimensional data space 580 constructed based on the two eigenvectors defined by the equator and prime meridian of the sphere 504.

When re-visualized in the data space 540 or 580, data points closer to the focus point correspond to less distortion than data points that are distant from the focus point. For example, a first data point 524 and a second data point 526 have a first distance from each other in the data space 500, and a third data point 528 and a fourth data point 530 have a second distance from each other in the data space 500. The first and second data points 524 and 526 are closer to the focus point 508 than the third and fourth data point 530. After the data points in the set of data are projected from the data space 500 to the data space 580, the first and second data points 524 and 526 have a distance from each other in the data space 580 that is nearly the same as the first distance. However, the third and fourth data points 528 and 530 have a third distance from each other in the data space 580, which is greater than the second distance. The third distance corresponds to a larger deviation from the second distance. A data point or a subset of data points that are closer to the focus point correspond to a smaller amount of distortion compared to a data point or a subset of data point that are further away from the focus point. Thus, when the set of data is re-visualized, a region around the focus point 506 or 508 is emphasized (i.e., with less distortion), while portions of the data points located outside the region are visually distorted.

When the same island 502 is projected from the three-dimensional data space 500 to the two-dimensional data spaces 540 and 580, the projected island in the data space 540 is associated with a larger distortion than the projected island in the data space 580. This is at least partially caused by the locations of the focus points 506 and 508. The data points in the set of data have a larger distance from the focus point 506 than the focus point 508, and therefore, their projections in the data space 540 have a higher distortion level than their projection in the data space 580.

It is noted that the eigenvectors associated with the lines 514, 516, 518 and 520 are primary eigenvectors. In some implementations, the primary eigenvectors are determined from one or more secondary eigenvectors. A positive semi-definite differential operator is applied, such that a projection of the geodesics associated with the set of data is minimized with respect to the secondary eigenvector. By these means, the secondary eigenvector can be identified, and in this example, a secondary eigenvector is perpendicular to the tangent surface at each data point.

Figure 6A:
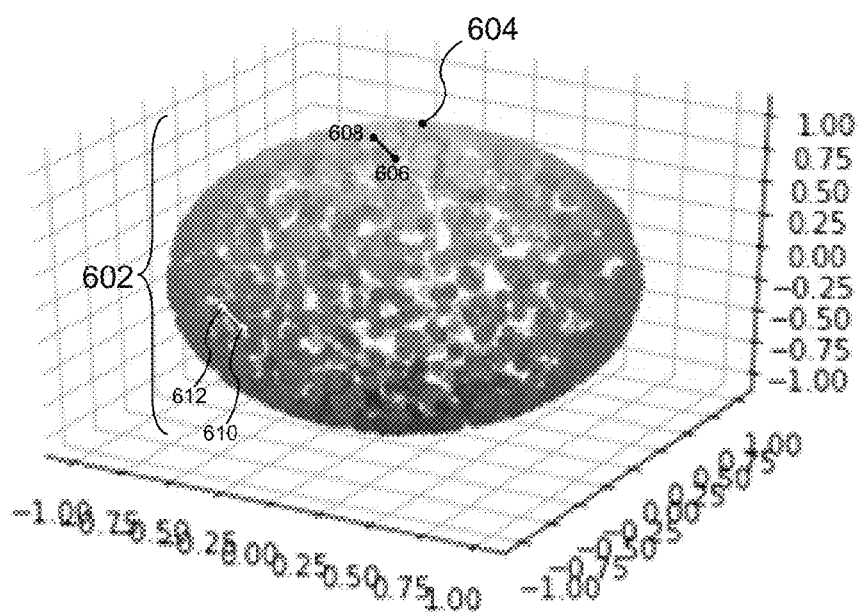
FIG. 6A illustrates a representative first data space including a set of data points distributed in an ellipsoid region in accordance with some implementations.
Figure 6B:
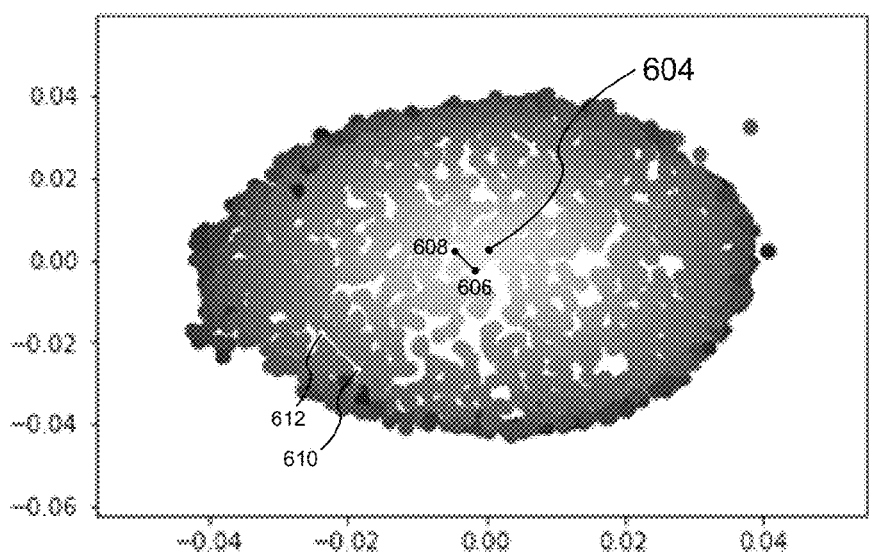
FIG. 6B illustrates a representative second data space having an elliptical area to which the data points are projected with reference to two primary eigenvectors associated with a focus point, in accordance with some implementations.
Figure 6C:
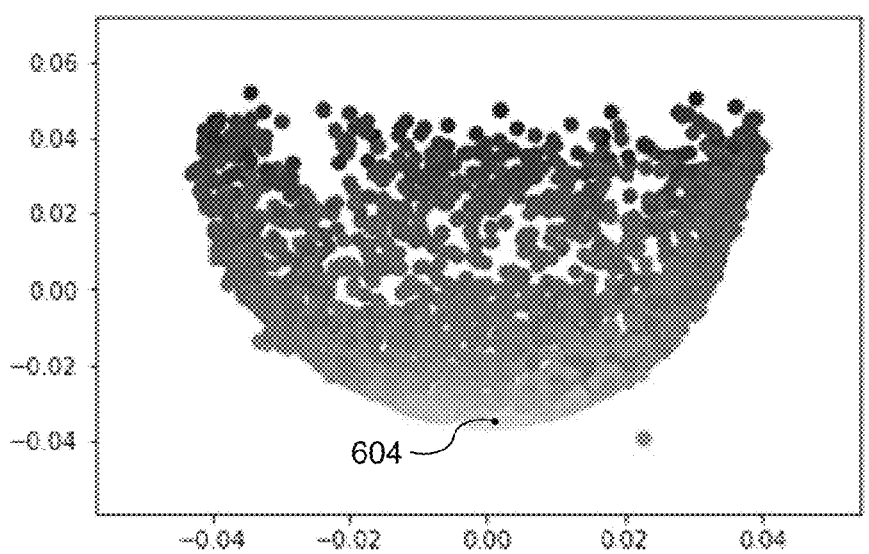
FIG. 6C illustrates a representative second data space where the ellipsoid is partially unrolled with reference to a secondary eigenvector in accordance with some implementations.

Geodesic characterization of a vector field provides a means to generate useful projections to a second data space, which exactly match dimensions of a manifold formed by the set of data in a first data space. FIG. 6A illustrates a representative first data space 600 including a set of data points distributed in an ellipsoid region 602 in accordance with some implementations. FIG. 6B illustrates a representative second data space 640 having an elliptical area to which the data points are projected with reference to two primary eigenvectors associated with a focus point in accordance with some implementations. FIG. 6C illustrates a representative second data space 680 where the sphere is partially unrolled with reference to a secondary eigenvector in accordance with some implementations.

A focus point 604 is selected among the set of data in the first data space 600. A set of geodesics is constructed using the focus point 604 as a starting point, and each geodesic is configured to connect the focus point to the respective data point in the first data space. The constructed geodesics are used to form a vector field on a sparse basis because the data points in the set of data are discrete. In some implementations, the vector field is constructed to approximate a geodesic curve between the focus point 604 and each data point in the set of data based on Djikstra's algorithm. The vector field is optionally adjusted at a subset of selected data points. In some implementations, the vector at each data point has a magnitude equal to a length of a corresponding geodesic and a direction in a tangent surface at the respective data point.

A second number of primary eigenvectors are determined in the first data space 600. In an example, the second number of primary eigenvectors includes two eigenvectors that are perpendicular to each other, and are located in the tangent surface at the respective data point. For each data point, a second number of projection values are determined in association with the second number of primary eigenvectors, which can be used to create the second data space 640 and re-visualize the set of data therein (FIG. 6B). In some instances, one or more secondary eigenvectors exist, but are associated with constant and small projections from the data points in the set of data. The secondary eigenvectors are not visualized in the second data space 640. When the secondary eigenvectors are used to visualize the set of data, the data points in the ellipsoid 602 cannot be unwrapped because a large portion of the set of data overlaps with each other in the corresponding data space (FIG. 6C).

In some implementations, a positive semidefinite differential operator is constructed for the vector field established based on the geodesics to determine the eigenvectors of the second data space within the first data space. The positive semidefinite differential operator is applied to modify the displayed data visualization, thereby emphasizing a region around the focus point and visually distorting portions of the data visualization outside of the region.

When re-visualized in the data space 640, data points closer to the focus point correspond to less distortion than data points that are distant from the focus point. For example, a first data point 606 and a second data point 608 have a first distance from each other in the data space 600, and a third data point 610 and a fourth data point 612 also have the first distance from each other in the data space 600. The first and second data points 606 and 608 are closer to the focus point 604 than the third and fourth data points 610 and 612. After the data points in the set of data are projected from the data space 600 to the data space 640, the first and second data points 606 and 608 have a second distance from each other in the data space 640, and the third and fourth data points 610 and 612 have a third distance from each other in the data space 640. The third distance corresponds to a larger deviation from the first distance compared with the second distance. A data point or a subset of data points that are closer to the focus point 604 correspond to a smaller amount of distortion compared to a data point or a subset of data points that are further away from the focus point. When the set of data is re-visualized, a region around the focus point 604 is emphasized (i.e., with less distortion), while portions of the data points located outside the region are visually distorted.

Figure 7A:
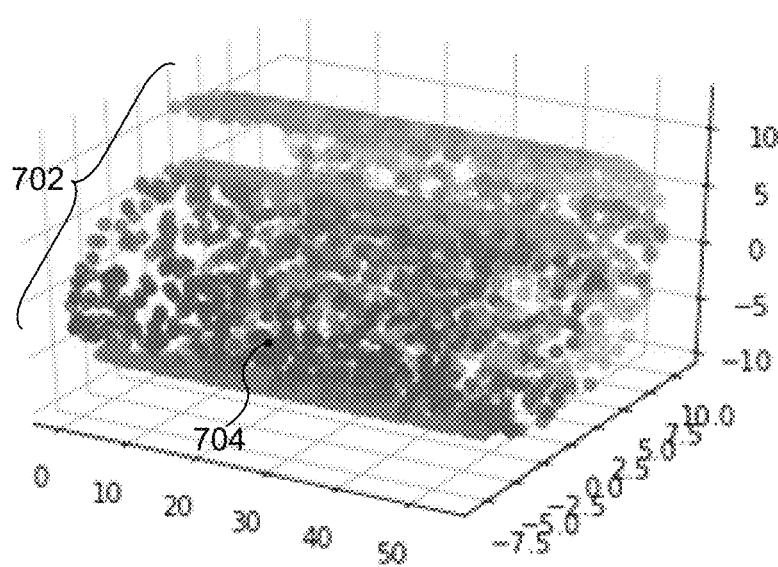
FIG. 7A illustrates a representative first data space including a set of data distributed on or in proximity to a rolled surface in accordance with some implementations.
Figure 7B:
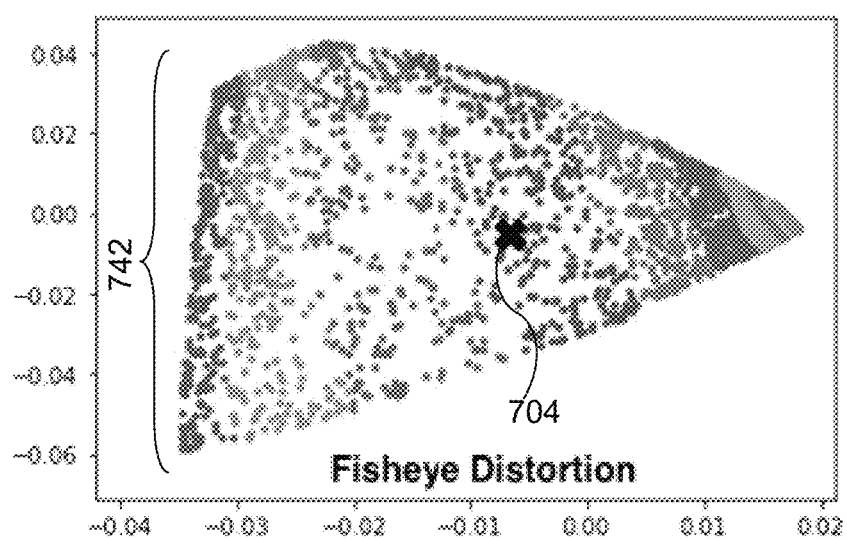
FIG. 7B illustrates a representative second data space where the data points in the set of data are projected from the 3D data space to a flat two-dimensional area with reference to a focus point in accordance with some implementations.
Figure 7C:
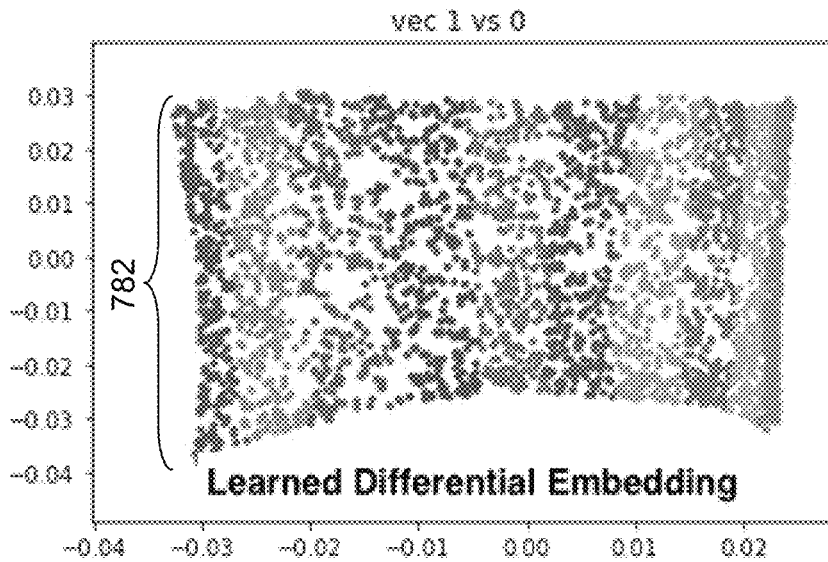
FIG. 7C illustrates a representative second data space where the data points in the set of data are projected to a flat two-dimensional area according to a learned differential operator embedding, in accordance with some implementations.

FIG. 7A illustrates a representative first data space 700 including a set of data distributed on or in proximity to a rolled surface 702 in accordance with some implementations. FIG. 7B illustrates a representative second data space 740 where the data points in the set of data are projected from the 3D data space to a flat two-dimensional area 742 with reference to a focus point 704 in accordance with some implementations. FIG. 7C illustrates a representative second data space 780 where the data points in the set of data are projected to a flat two-dimensional area 782 according to a learned differential operator embedding in accordance with some implementations. The learned differential operator embedding is configured to compensate distortion associated with the focus point 704. However, the projection of the set of data into the second data space 740 has a higher level of data distortion than the projection into the second data space 780, which applies the learned differential operator embedding. In contrast, a subset of the data points that surrounds the focus point 704 is visualized with a higher resolution in the second data space 740 than in the second data space 780.

Specifically, the set of data is distributed on or in proximity to the rolled surface 702 in the first data space 700, and the rolled surface 702 has a non-linear characteristic. It is noted that if a surface is linear, the surface is flat and not curved such that the first data space 700 merely needs to be rotated to a perspective in which the entire flat surface is exposed. The focus point 704 is selected among the set of data in the first data space 700. A set of geodesics is constructed using the focus point 704 as a starting point, and each geodesic is configured to connect the focus point 704 to a respective data point in the first data space 700. The constructed geodesics are used to form a vector field on a sparse basis because the data points in the set of data are discrete. In some implementations, the vector field is constructed to approximate a geodesic curve between the focus point 704 and each data point in the set of data based on Djikstra's algorithm. The vector field is optionally adjusted at a subset of selected data points. In some implementations, the vector at each data point has a magnitude equal to a length of a corresponding geodesic and a direction in a tangent surface of the rolled surface 702 at the respective data point.

Figure 8A:
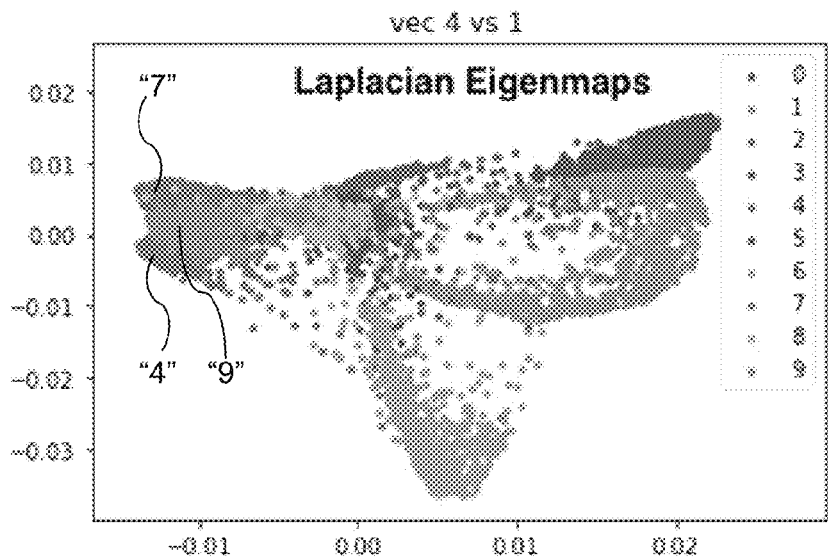
FIG. 8A illustrates a two-dimensional data space where Modified National Institute of Standards and Technology (MNIST) digits are visualized according to a Laplacian eigenmap embedding (prior art) in accordance with some implementations.

FIG. 8A illustrates a two-dimensional data space 800 where Modified National Institute of Standards and Technology (MNIST) digits are visualized according to a Laplacian eigenmap embedding (prior art) in accordance with some implementations. An MNIST database of handwritten digits has a training set of 60,000 examples, and a test set of 10,000 examples. It is a subset of a larger set available from the NIST. The digits have been size-normalized and centered in a fixed-size image. The MNIST database of handwritten digits allow people who want to try learning techniques and pattern recognition methods on real-world data while spending minimal efforts on preprocessing and formatting. In the prior art Laplacian eigenmap embedding, the digit "4" is substantially close to the digits "7" and "9," and therefore, it is difficult to differentiate the digit "4" from the digits "7" and "9" (typographically the symbol "4" is similar to the symbol "7" and similar to the symbol "9').

Figure 8B:
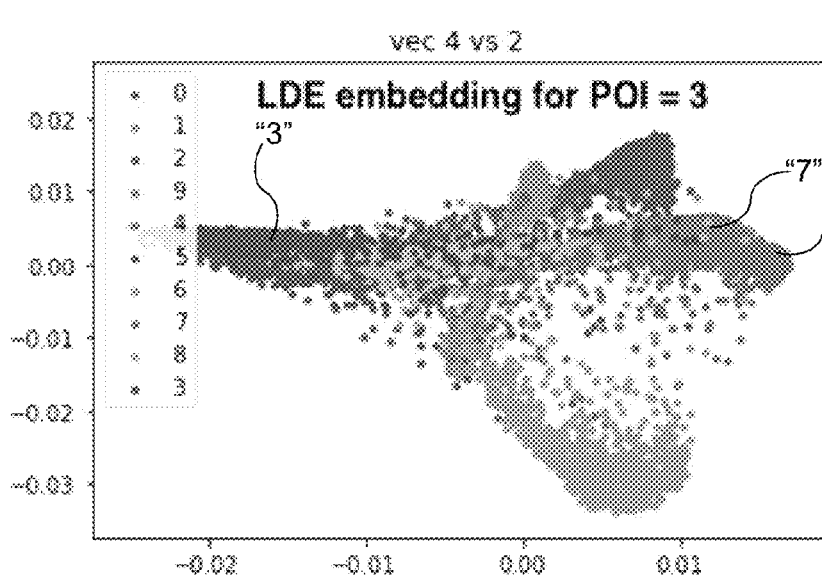
FIG. 8B illustrates a two-dimensional data space where MNIST digits are visualized using a learned differential embedding with a center at an image of "3" in accordance with some implementations.
Figure 8C:
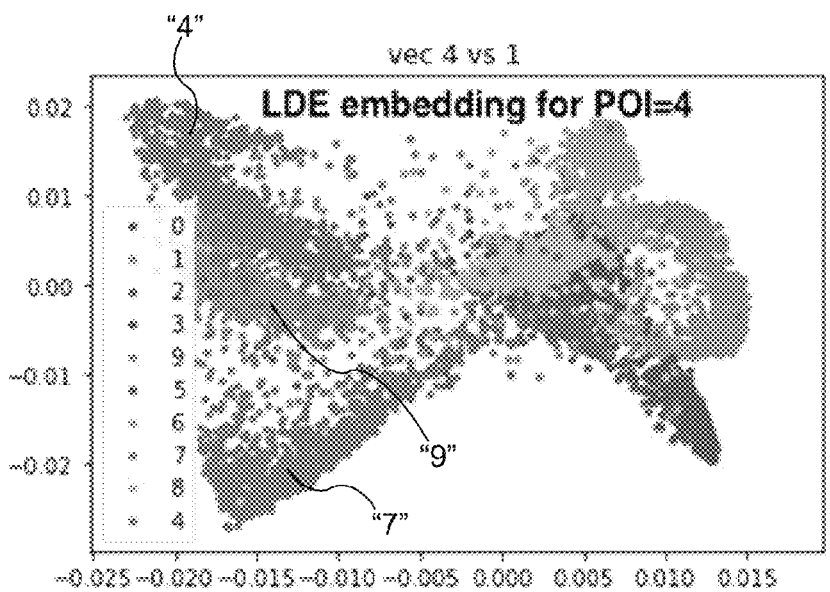
FIG. 8C illustrate a two-dimensional data space where MNIST digits are visualized using a learned differential embedding with a center at an image of "4" in accordance with some implementations.

FIG. 8B illustrates a two-dimensional data space 840 where MNIST digits are visualized using a learned differential embedding with a center at an image of "3" in accordance with some implementations. FIG. 8C illustrate a two-dimensional data space 880 where MNIST digits are visualized using a learned differential embedding with a center at an image of "4" in accordance with some implementations. The learned differential embedding refers to a method of identifying a focus point or center, constructing geodesics using the focus point, determining a vector field, identifying a second data space including one or more eigenvectors, and projecting the vector field to the second data space. In the two-dimensional data space 840 centered at the image of the digit "3," the digit "9" is barely shown, and the digit "4" is still substantially close to the digits "7" and "9." In contrast, in the two-dimensional data space 880 centered at the image of the digit "4," the digit "4" is substantially close to the digit "9" and it can be difficult to differentiate the digit "4" from the digit "9." The digit "4" is not close to the digit "7" in the data space 880, and can be easily differentiated from the digit "7." Thus, by focusing on the neighborhoods around the digit "4," one obtains the data space 880 that is able to distinguish amongst the similar digits "4," "7," and "9" better, and the use of the learned differential embedding enhances the visualization effect of the MNIST digits.

Figure 9A:
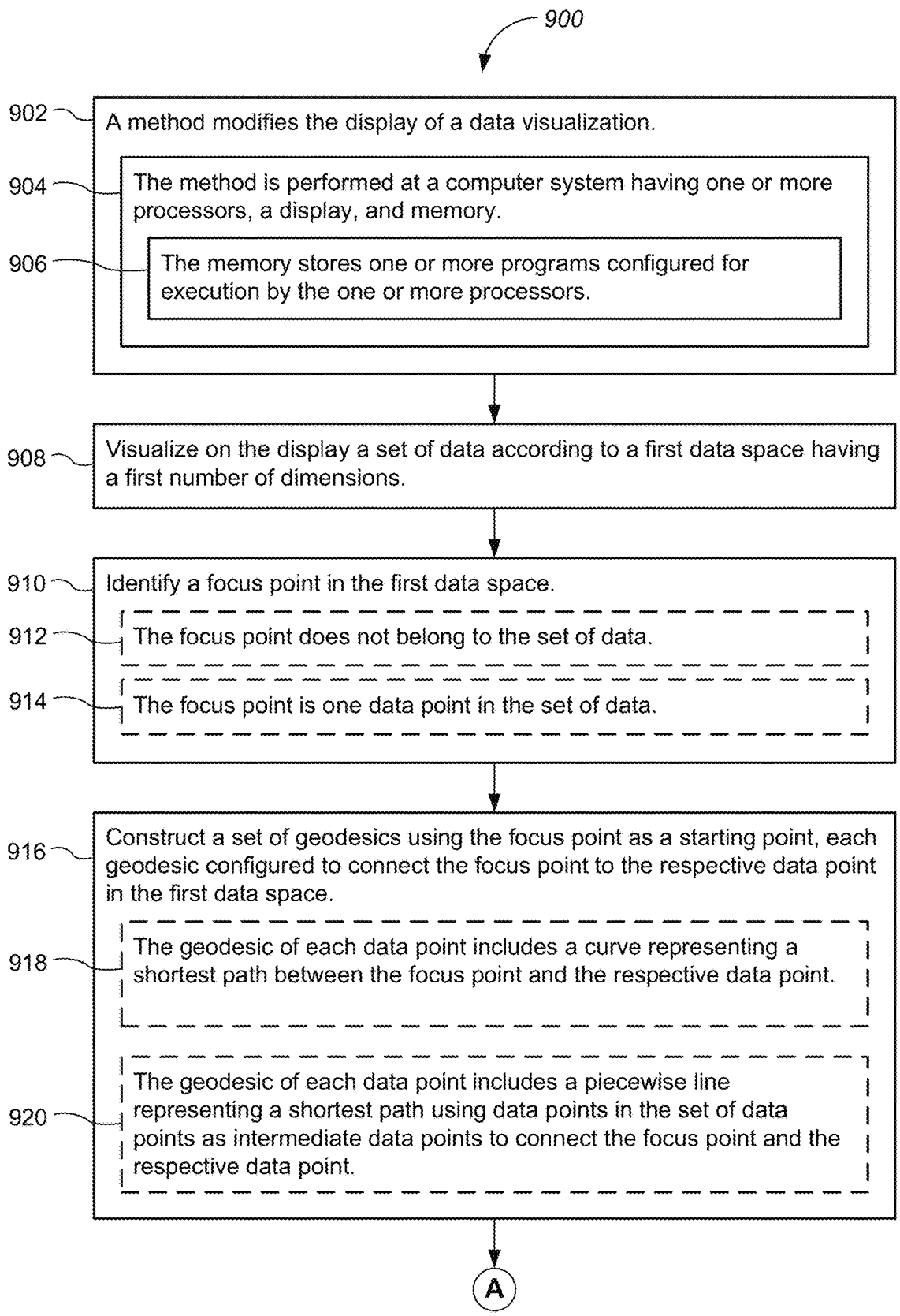
FIGS. 9A and 9B provide a flow chart of a representative method for modifying display of data visualizations in accordance with some implementations.
Figure 9B:
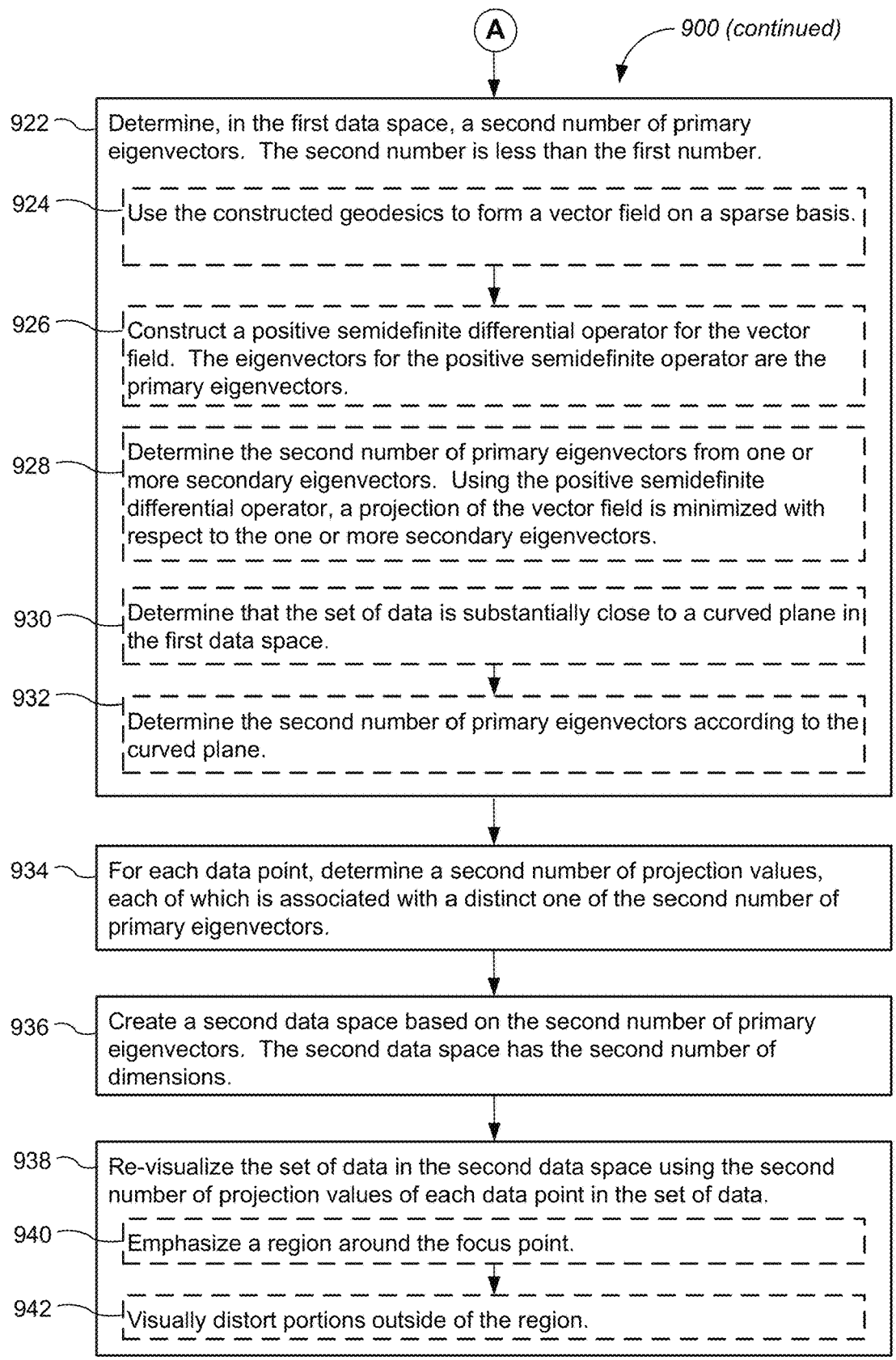

FIGS. 9A and 9B provide a flow chart of a representative method 900 for modifying (902) display of data visualization in accordance with some implementations. The method 900 is implemented (904) by a computer system 200 (e.g., a personal device 102, a data visualization server 104, or a combination thereof), and is optionally governed by instructions that are stored (906) in a non-transitory computer readable storage medium and executed by one or more processors of the computer system 200. Each of the operations shown in FIGS. 9A and 9B may correspond to instructions stored in the computer memory or computer readable storage medium (e.g., the memory 214 in FIG. 2) of the computer system 200. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 900 may be combined and/or the order of some operations may be changed.

The computer system 200 visualizes (908) on the display a set of data according to a first data space having a first number of dimensions (e.g., 3, 4, or 5 dimensions). A focus point is identified (910) in the first data space. In some implementations, the focus point (e.g., the focus point 506 in FIG. 5A) does not belong (912) to the set of data. In some implementations, the focus point (e.g., the focus point 508 in FIG. 5A) is (914) one data point in the set of data. The computer system 200 further constructs (916) a set of geodesics using the focus point as a starting point. Each geodesic is configured (916) to connect the focus point to a respective data point in the first data space. In some implementations, the geodesic of each data point is (918) a curve (e.g., the line 512 or the line 522 in FIG. 5A) representing a shortest path between the focus point and the respective data point. Alternatively, in some implementations, the geodesic of each data point is (920) a piecewise line representing a shortest path using data points in the set of data points as intermediate data points to connect the focus point and the respective data point. In some implementations, for each data point in the set of data, the computer system approximates a geodesic curve connecting the focus point to the respective data point based on Djikstra's algorithm.

The computer system 200 determines (922) in the first data space a second number (e.g., 1 or 2) of primary eigenvectors. The second number is (922) less than the first number. In some implementations, the computer system 200 uses (924) the constructed geodesics to form a vector field on a sparse basis, and constructs (926) a positive semidefinite differential operator for the vector field. The eigenvectors for the positive semidefinite differential operator are the primary eigenvectors.

Further, in some implementations, in accordance with the positive semidefinite differential operator, a projection of the vector field is minimized (928) with respect to one or more secondary eigenvectors (e.g., the eigenvector 420S in FIG. 4A). The second number of primary eigenvectors is determined (928) from the one or more secondary eigenvectors. For example, the primary eigenvectors (e.g., the eigenvector 420P in FIG. 4A) are identified as normalized and orthogonal vectors in a surface perpendicular to one of the secondary eigenvectors. In another example, the computer system 200 determines (930) that the data points are on a curved plane or substantially close to the curved plane in the first data space (e.g., the spaces 500, 600, and 700). The second number of primary eigenvectors is determined (932) according to the curved plane. Specifically, in some implementations, the curved plane corresponds to a flat tangent place at a data point, and at the data point, two primary eigenvectors are located on the flat tangent plane. In some implementations, the curved plane is part of a surface of a sphere, and the second number of primary eigenvectors are defined by a meridian of longitude (also called a line of longitude) and a parallel of latitude (also called a line of latitude) passing the focus point. In some implementations, the curved plane is part of a surface of a sphere, and the second number of primary eigenvectors is defined by a prime meridian and an equator of the sphere.

For each data point, the computer system 200 determines (934) a second number of projection values, each of which is associated with a distinct one of the second number of primary eigenvectors. In some implementations, this involves expressing each data point as a respective linear combination of the primary eigenvectors. The coefficients from the linear combination are then used as coordinates of the data point in the second data space.

The method creates (936) a second data space based on the second number of primary eigenvectors. The second data space has the second number of dimensions. The computer system 200 re-visualizes (938) the set of data in the second data space using the second number of projection values of each data point in the set of data. In some implementations, re-visualization of the set of data emphasizes (940) a region around the focus point, and the set of data is visually distorted (942) in portions outside of the region. In some implementations, the first data space has three or more dimensions and the second data space has one or two dimensions. In some implementations, the first data space has more than three dimensions, and the second data space has three dimensions.

It should be understood that the particular order in which the operations in FIGS. 9A and 9B have been described is merely exemplary and is not intended to indicate that the described order is the only order in which the operations could be performed. One of ordinary skill in the art would recognize various ways to reorder the operations described herein. Additionally, it should be noted that details of other processes described below with respect to the method 1000 (in FIG. 10) are also applicable in an analogous manner to method 900 described herein with respect to FIGS. 9A and 9B. For brevity, these details are not repeated here.

Figure 10:
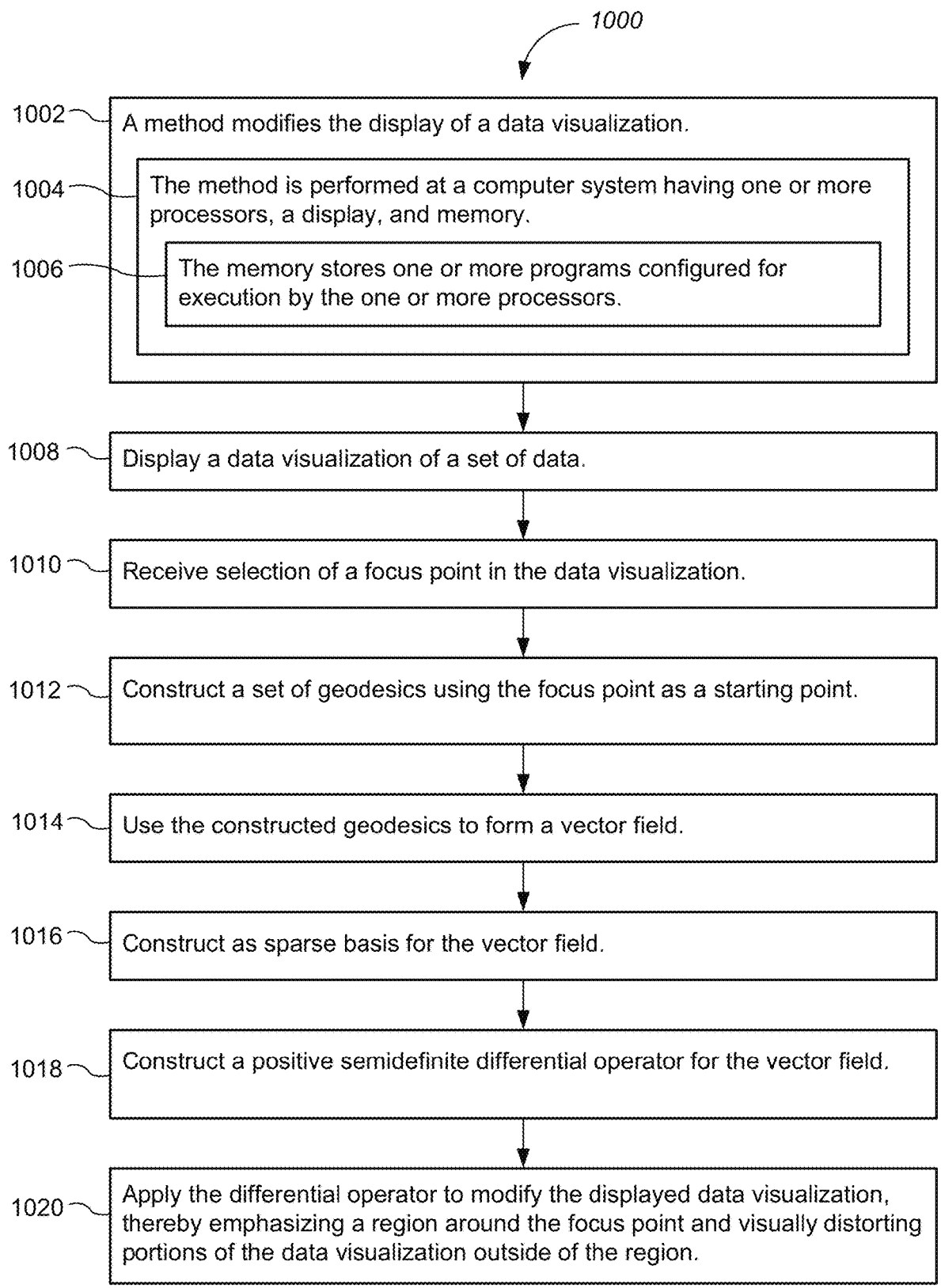
FIG. 10 is a flow chart of another representative data visualization method in accordance with some implementations.

FIG. 10 is a flow chart of another representative data visualization method 1000 in accordance with some implementations. The method modifies (1002) the display of a data visualization. The method 1000 is implemented (1004) by a computer system 200 (e.g., a personal device 102 or a data visualization server 104), and is optionally governed by instructions that are stored (1006) on a non-transitory computer readable storage medium and executed by one or more processors of the computer system 200. Each of the operations shown in FIG. 10 may correspond to instructions stored (1006) in the computer memory or computer readable storage medium (e.g., the memory 214 in FIG. 2) of the computer system 200. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1000 may be combined and/or the order of some operations may be changed.

The computer system 200 displays (1008) a data visualization of a set of data. The computer system 200 receives (1010) selection of a focus point in the data visualization, and constructs (1012) a set of geodesics using the focus point as a starting point. The computer system 200 uses (1014) the constructed geodesics to form a vector field and constructs (1016) a sparse basis for the vector field. The computer system 200 constructs (1018) a positive semidefinite differential operator for the vector field and applies (1020) the differential operator to modify the displayed data visualization, thereby emphasizing a region around the focus point and visually distorting portions of the data visualization outside of the region. In some implementations, this includes determining a set of eigenvectors for the differential operator, and expressing each data point from the first data visualization as a linear combination of the eigenvectors. This provides an embedding of the set of data into a space with a smaller number of dimensions (the number of eigenvectors).

In some implementations, the positive semidefinite differential operator includes solving an optimization problem given the vector field $F_{target}$:

$$\text{Minimize}_{w \geq 0} \|F(w) - F_{target}\|_F^2 \quad (1)$$

where w is a weight vector. The optimization problem returns one or more primary eigenvectors that can be used to re-visualize data points in the set of data in a lower dimensional data space.

It should be understood that the particular order in which the operations in FIG. 10 have been described is merely exemplary and is not intended to indicate that the described order is the only order in which the operations could be performed. One of ordinary skill in the art would recognize various ways to reorder the operations described herein. Additionally, it should be noted that details of other processes described above with respect to the method 900 (e.g., in FIGS. 9A and 9B) are also applicable in an analogous manner to the method 1000 described here with respect to FIG. 10. For brevity, these details are not repeated here.

This application "unrolls" a visual representation in a first data space to a second data space having a smaller number of dimensions, thereby focusing on desired properties and/or desired regions of the visual representation. A vector field is constructed and manipulated on the visual representation and a set of associated data. This vector field characterizes a global coordinate chart when it exists, and is defined by a solution of an MVU optimization problem. A resulting low-dimensional projection in the second data space limits distortion in regions of interest (e.g., regions surrounding a focus point). This vector field is determined without resorting to an expensive semidefinite program that demands computational and storage resources on a computer system. In some implementations, the resulting optimization problem is a sparse non-negative linear least squares problem that can be solved much more efficiently.

Some implementations characterize the dual solution for the MVU optimization problem as a second order differential operator and infinitesimal generator of an anisotropic diffusion process. This furthers recent systematic characterization of existing local spectral methods (e.g., Laplacian Eigenmaps) using a limit differential operator and boundary conditions. Data revisualization in a lower dimensional space applies a different potential limit operator, and in some implementations, solutions of the resulting differential equation are determined by a first order differential term, rather than boundary conditions.

In some implementations, a data visualization method includes characterizing Maximum Variance Unfolding (MVU) as a solution of a second order differential equation, obtaining a derivation of an associated vector field, estimating and modifying the vector field to obtaining a desired embedding (e.g., a second data space having a smaller number of dimensions), and reconstructing a positive semidefinite differential operator that allows one to compute the embedding. The implications of these are a deeper understanding of how manifold learning methods work. They are related to each other and to development of new nonlinear dimensionality reduction methods. These methods provide a moderately intuitive "design space" for engineering nonlinear dimensionality reduction methods to achieve desired goals. In particular, this applies to visualization applications and efficient algorithms for carrying out these engineering tasks. Some concrete examples of these implications include providing examples where MVU fails to correctly unroll a manifold and new methods to project manifolds that cannot be isometrically embedded into a smaller number of dimensions.

In the previous analysis, there are potentially two distinct sets of eigenvectors. Some implementations use principal component analysis (PCA) on a point (e.g., a selected focus point) and its neighbors to form a first set of eigenvectors. The eigenvectors from PCA are used to construct a differential operator at the point. The eigenvectors for the differential operator form a second set of eigenvectors, which are referred to as the "primary" eigenvectors in the earlier analysis. Projections onto the primary eigenvectors provide the embedding of the first data space into the second data space (e.g., the coordinates of each data point in the second data space are just the coefficients of expressing each data point as a unique combination of the eigenvectors). An important advantage of the disclosed techniques is that PCA is not required. Instead, the geodesics are used to build the differential operator.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for modifying display of data visualizations, comprising:
    at an computer system having a display, one or more processors, and memory storing one or more programs configured for execution by the one or more processors:
        visualizing on the display a set of data according to a first data space having a first number of dimensions;
        receiving user selection of a focus point in the first data space;
        constructing a set of geodesics using the focus point as a starting point, each geodesic configured to connect the focus point to a respective data point in the first data space, wherein a vector field formed by the geodesics defines a matrix;
        computing a second number of primary eigenvectors for the matrix, wherein the second number is less than the first number;
        for each data point, determining a respective second number of projection values, each of which is associated with a distinct one of the primary eigenvectors, wherein the projection values form a second data space having the second number of dimensions; and
        re-visualizing the set of data in the second data space using the respective second number of projection values of each data point in the set of data, thereby facilitating subsequent analysis of the set of data visualized in the second data space, which has fewer dimensions than the first data space, with a focus on the focus point.

2. The method of claim 1, wherein defining the matrix uses
    a positive semidefinite differential operator for the vector field and the primary eigenvectors are eigenvectors for the positive semidefinite differential operator.

3. The method of claim 2, wherein determining the second number of projection values for each data point comprises:
    expressing each data point as a respective linear combination of the primary eigenvectors; and
    using respective coefficients from the respective linear combination as coordinates of the respective data point in the second data space.

4. The method of claim 1, wherein re-visualizing the set of data in the second data space comprises:
    emphasizing a region around the focus point; and
    visually distorting portions of the data visualization outside of the region.

5. The method of claim 1, wherein the first data space has three or more dimensions, and the second data space has one or two dimensions.

6. The method of claim 5, wherein determining, in the first data space, the second number of primary eigenvectors comprises:
    determining that the set of data is substantially close to a curved plane in the first data space; and
    determining the second number of primary eigenvectors according to the curved plane.

7. The method of claim 6, wherein the curved plane is part of a surface of a sphere, and the second number of primary eigenvectors are defined by a meridian of longitude and a parallel of latitude passing the focus point.

8. The method of claim 6, wherein the curved plane is part of a surface of a sphere, and the second number of primary eigenvectors are defined by a prime meridian and an equator of the sphere.

9. The method of claim 1, wherein the first data space has more than three dimensions and the second data space has three dimensions.

10. The method of claim 1, wherein the focus point does not belong to the set of data.

11. The method of claim 1, wherein the respective geodesic of each data point is a curve representing a shortest path between the focus point and the respective data point.

12. The method of claim 1, wherein the focus point is one data point in the set of data.

13. The method of claim 12, wherein the respective geodesic of each data point is a piecewise line representing a shortest path using data points in the set of data as intermediate data points to connect the focus point and the respective data point.

14. The method of claim 1, further comprising:
for each data point in the set of data, approximating a geodesic curve connecting the focus point to the respective data point based on Djikstra's algorithm.

15. A computer system, comprising:
one or more processors;
memory;
a display; and
one or more programs stored in the memory and configured for execution by the one or more processors, the one or more programs comprising instructions for:
visualizing on the display a set of data according to a first data space having a first number of dimensions;
receiving user selection of a focus point in the first data space;
constructing a set of geodesics using the focus point as a starting point, each geodesic configured to connect the focus point to a respective data point in the first data space, wherein a vector field formed by the geodesics defines a matrix;
computing a second number of primary eigenvectors for the matrix, wherein the second number is less than the first number;
for each data point, determining a respective second number of projection values, each of which is associated with a distinct one of the primary eigenvectors, wherein the projection values form a second data space having the second number of dimensions; and
re-visualizing the set of data in the second data space using the respective second number of projection values of each data point in the set of data, thereby facilitating subsequent analysis of the set of data visualized in the second data space, which has fewer dimensions than the first data space, with a focus on the focus point.

16. The computer system of claim 15, wherein re-visualizing the set of data in the second data space comprises:
emphasizing a region around the focus point; and
visually distorting portions of the data visualization outside of the region.

17. The computer system of claim 15, wherein the instructions for determining, in the first data space, the second number of primary eigenvectors comprise instructions for:
determining that the set of data is substantially close to a curved plane in the first data space; and
determining the second number of primary eigenvectors according to the curved plane.

18. A non-transitory computer readable storage medium storing one or more programs configured for execution by a computer system having one or more processors, memory, and a display, the one or more programs comprising instructions for:
visualizing on the display a set of data according to a first data space having a first number of dimensions;
receiving user selection of a focus point in the first data space;
constructing a set of geodesics using the focus point as a starting point, each geodesic configured to connect the focus point to a respective data point in the first data space, wherein a vector field formed by the geodesics defines a matrix;
computing a second number of primary eigenvectors for the matrix, wherein the second number is less than the first number;
for each data point, determining a respective second number of projection values, each of which is associated with a distinct one of the primary eigenvectors, wherein the projection values form a second data space having the second number of dimensions; and
re-visualizing the set of data in the second data space using the respective second number of projection values of each data point in the set of data, thereby facilitating subsequent analysis of the set of data visualized in the second data space, which has fewer dimensions than the first data space, with a focus on the focus point.

19. The non-transitory computer readable storage medium of claim 18, wherein defining the matrix uses
a positive semidefinite differential operator for the vector field and the primary eigenvectors are eigenvectors for the positive semidefinite differential operator.

20. The non-transitory computer readable storage medium of claim 19, wherein the instructions for determining the second number of projection values for each data point comprise instructions for:
expressing each data point as a respective linear combination of the primary eigenvectors; and
using respective coefficients from the respective linear combination as coordinates of the respective data point in the second data space.

* * * * *